(12) United States Patent
Ide et al.

(10) Patent No.: US 11,156,293 B2
(45) Date of Patent: Oct. 26, 2021

(54) METAL GASKET

(71) Applicant: NOK CORPORATION, Tokyo (JP)

(72) Inventors: Kento Ide, Makinohara (JP); Katsuma Imai, Makinohara (JP); Hirotaka Muragishi, Makinohara (JP)

(73) Assignee: NOK CORPORATION

( * ) Notice: Subject to any disclaimer, the term of this patent is extended or adjusted under 35 U.S.C. 154(b) by 83 days.

(21) Appl. No.: 16/465,593

(22) PCT Filed: Oct. 17, 2017

(86) PCT No.: PCT/JP2017/037446
§ 371 (c)(1),
(2) Date: May 31, 2019

(87) PCT Pub. No.: WO2018/123214
PCT Pub. Date: Jul. 5, 2018

(65) Prior Publication Data
US 2019/0383231 A1    Dec. 19, 2019

(30) Foreign Application Priority Data

Dec. 27, 2016  (JP) .............................. JP2016-252407

(51) Int. Cl.
*F16J 15/08* (2006.01)
*F02F 11/00* (2006.01)

(52) U.S. Cl.
CPC ........... *F16J 15/0818* (2013.01); *F02F 11/00* (2013.01); *F02F 11/002* (2013.01); *F16J 2015/0868* (2013.01)

(58) Field of Classification Search
CPC .... F16J 15/0818; F16J 15/0825; F16J 15/123; F16J 2015/085; F16J 2015/0868; F02F 11/00; F02F 11/002
See application file for complete search history.

(56) References Cited

U.S. PATENT DOCUMENTS

| 2,699,349 A | * | 1/1955 | Brownlee | ............ | F16J 15/0818 |
| | | | | | 277/592 |
| 4,213,620 A | * | 7/1980 | Kennedy | ................ | F16J 15/123 |
| | | | | | 277/596 |

(Continued)

FOREIGN PATENT DOCUMENTS

| EP | 1184608 A2 | 3/2002 |
| JP | S59-11141 U | 1/1984 |

(Continued)

OTHER PUBLICATIONS

Extended European Search Report for Patent Application No. EP 17887594.4 dated Nov. 15, 2019 (6 pages).

*Primary Examiner* — Nicholas L Foster
(74) *Attorney, Agent, or Firm* — Harness, Dickey & Pierce, P.L.C.

(57) ABSTRACT

A metal gasket containing a metal plate having an opening portion and having a seal bead having a bent cross-sectional shape formed along the opening portion in order to suppress a variation in the height of the seal bead due to a tensile stress generated in the outer periphery of the seal bead in the molding of the seal bead is provided with a lightening hole extending along the outer periphery of the seal bead, in which the distance between the lightening hole and the seal bead is constant.

6 Claims, 3 Drawing Sheets

(56) References Cited

U.S. PATENT DOCUMENTS

| | | | | |
|---|---|---|---|---|
| 4,915,398 A * | 4/1990 | Kitagawa | ............ | F16J 15/0818 277/595 |
| 4,998,741 A * | 3/1991 | Udagawa | ................ | F16J 15/0825 277/595 |
| 5,267,740 A * | 12/1993 | Stritzke | ................ | F16J 15/0818 277/316 |
| 5,853,175 A * | 12/1998 | Udagawa | ............ | F16J 15/0825 277/595 |
| 6,027,124 A * | 2/2000 | Ishida | ................ | F16J 15/0825 277/594 |
| 6,406,032 B1 * | 6/2002 | Miyaoh | ................ | F16J 15/0818 277/594 |
| 6,428,016 B1 * | 8/2002 | Miyaoh | ................ | F16J 15/0818 277/591 |
| 6,588,765 B2 * | 7/2003 | Hiramatsu | ............ | F16J 15/0818 277/591 |
| 7,806,415 B2 * | 10/2010 | Diez | ................ | F02F 11/002 277/593 |
| 7,806,416 B2 * | 10/2010 | Diez | ................ | F16J 15/0818 277/593 |
| 9,581,244 B2 * | 2/2017 | Anzai | ................ | F16J 15/02 |
| 10,288,006 B2 * | 5/2019 | Nakamura | ............ | B21D 22/02 |
| 10,514,100 B2 * | 12/2019 | Ide | ................ | F01N 13/1827 |
| 2001/0026045 A1 * | 10/2001 | Hiramatsu | ............ | F16J 15/0818 277/591 |
| 2006/0103079 A1 * | 5/2006 | Diez | ................ | F16J 15/0825 277/591 |
| 2007/0164518 A1 * | 7/2007 | Imai | ................ | F16J 15/0825 277/594 |
| 2008/0073858 A1 * | 3/2008 | Kullen | ................ | F16J 15/0818 277/593 |
| 2012/0153576 A1 * | 6/2012 | Prehn | ................ | F16J 15/0831 277/595 |
| 2012/0161403 A1 | 6/2012 | Kusano et al. | | |
| 2014/0008877 A1 * | 1/2014 | Anzai | ................ | F16J 15/0818 277/590 |
| 2015/0069720 A1 * | 3/2015 | Nakamura | ............ | F02F 11/002 277/595 |
| 2018/0119818 A1 * | 5/2018 | Ide | ................ | F01N 13/1827 |
| 2020/0191272 A1 * | 6/2020 | Schumacher | ........ | F16J 15/0818 |

FOREIGN PATENT DOCUMENTS

| | | |
|---|---|---|
| JP | S61-158360 A | 7/1988 |
| JP | 2000-97340 A | 4/2000 |
| JP | 2001-132843 A | 5/2001 |
| JP | H09-292027 A | 5/2001 |
| JP | 2007-187294 A | 7/2007 |
| JP | 2011-089440 A | 5/2011 |
| JP | 2013-231450 A | 11/2013 |

* cited by examiner

METAL GASKET

CROSS REFERENCE TO RELATED APPLICATIONS

This application is a U.S. National Stage application of International Application No. PCT/JP2017/037446, filed on Oct. 17, 2017 and published in Japanese as WO 2018/123214 on Jul. 5, 2018 and claims priority to Japanese Patent Application No. 2016-252407, filed on Dec. 27, 2016. The entire disclosures of the above applications are expressly incorporated by reference herein.

BACKGROUND

Technical Field

The present invention relates to a metal gasket to be used for connection portions of a cylinder and an exhaust system of an internal-combustion engine, for example.

Related Art

A metal gasket is known as a gasket placed between joint surfaces facing each other in a connection portion of an exhaust system of an internal-combustion engine, for example. As illustrated in FIG. 4 and FIG. 5, the metal gasket of this type contains a metal plate having an opening portion 102, in which a seal bead 101 having a cross-sectional shape bent in a chevron shape is formed along the opening portion 102 of the inner periphery serving as a flow passage. The metal gasket seals exhaust gas and the like passing through the opening portion 102 by the seal bead 101 (for example, see Japanese Unexamined Patent Application Publication No. 2013-231450).

In the metal gasket of this type, the outer shape of a flat plate 103 of the outer periphery of the seal bead 101 and the opening shape of the opening portion 102 are designed in conformity with the outer shape of a mating flange and the opening shape of the flow passage, and the shape and the dimension of the periphery of the seal bead 101 vary depending on specifications. Therefore, the distance from the seal bead 101 to an outer peripheral edge 103a of the flat plate 103 is not constant depending on the outer shape of the flat plate 103. In an example illustrated in FIG. 4, for example, a dimension L2 is larger than a dimension L1.

A tensile stress generated in the flat plate 103 of the outer periphery of the seal bead 101 in the molding of the seal bead 101 by a male mold and a female mold (not illustrated) acts so as to reduce a height h of the seal bead 101. The tensile stress becomes remarkable in a portion where the distance from the seal bead 101 to the outer peripheral edge 103a of the flat plate 103 is large, and therefore there is a concern that the height h of the seal bead 101 becomes nonuniform in the circumferential direction.

It is a technical object of the present invention to provide a metal gasket suppressing a variation in the height of a seal bead due to a tensile stress generated in a flat plate of the outer periphery of the seal bead in the molding of the seal bead and having a stable seal function.

SUMMARY

A metal gasket of the present invention is provided with a metal plate having an opening portion, a seal bead having a bent cross-sectional shape formed along the opening portion, and a lightening hole extending along the outer periphery of the seal bead with a constant distance between the lightening hole and the seal bead.

Effect of the Invention

According to the metal gasket of the present invention, a tensile stress generated in the outer periphery by the molding of the seal bead decreases to be uniform by the lightening holes extending along the outer periphery of the seal bead, and therefore a variation in the height of the seal bead due to the tensile stress can be suppressed and a stable seal function can be performed.

DETAILED DESCRIPTION

Figure 1:
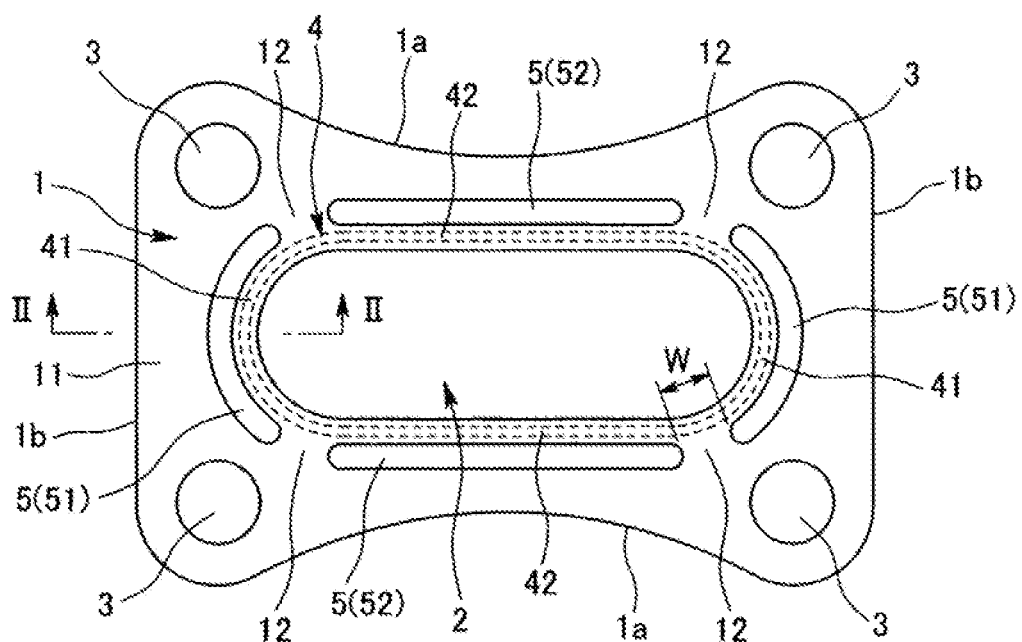
FIG. 1 is a plan view illustrating a first embodiment of a metal gasket according to the present invention.
Figure 2:
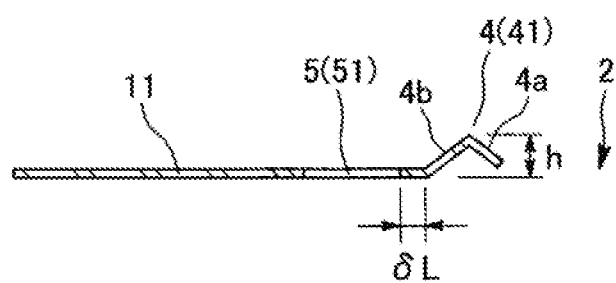
FIG. 2 is a cross-sectional view along the II-II line in FIG. 1.

A preferable embodiment of a metal gasket according to the present invention is described with reference to the drawings. FIG. 1 and FIG. 2 illustrate a first embodiment.

The metal gasket contains a thin metal plate 1 having moderate elasticity, such as a steel plate or an aluminum alloy. In the metal gasket, a port hole 2 located in a center portion and bolt insertion holes 3 located near the four corners on the outer periphery side of the port hole 2 are formed and a seal bead 4 is formed along the outer periphery of the port hole 2. The port hole 2 is equivalent to the opening portion.

In detail, the metal plate 1 is formed into an outer shape in which a pair of long sides 1a of a rectangle having rounded corners are formed into an inwardly curved curved-line shapes symmetrical to each other and the port hole 2 is formed into a long hole shape elongating in a direction orthogonal to short sides 1b of the metal plate 1 as illustrated in FIG. 1.

The seal bead 4 contains a flip-up bead, a full bead, a trapezoid bead, or a half bead, for example. The various kinds of beads are as follows as an example. In the flip-up bead, the width of an inclined surface 4a on the port hole 2 side is narrower than the width of an inclined surface 4b on the side opposite to the port hole 2 (one having a cross-sectional shape illustrated in FIG. 2). In the full bead, the inclined surfaces 4a and 4b on both the sides form a cross-sectional shape of symmetrical chevron shapes. In the trapezoid bead, a peak of the full bead is formed to be flat. In the half bead, an opening edge of the port hole 2 has a bump shape due to the inclined surface 4b on one side serving as the edge of the peak. The seal bead 4 has a pair of semicircular arc portions 41 extending along the outer periphery of the opening edge of the port hole 2 and symmetrical to each other and a pair of straight line portions 42 extending parallel to each other between the pair of semicircular arc portions 41.

On the outer periphery side of the seal bead 4, a plurality of lightening holes 5 extending along the outer periphery of the seal bead 4 are formed. The lightening holes 5 contain a pair of circular arc-shaped lightening holes 51 extending along the semicircular arc portions 41 of the seal bead 4 and a pair of straight line-shaped lightening holes 52 extending along the straight line portions 42 of the seal bead 4. The circular arc-shaped lightening holes 51 and the straight line-shaped lightening holes 52 are discontinuous from each other. In other words, an inner peripheral portion of the metal plate 1 where the seal bead 4 is formed and a flat plate 11 of the metal plate 1 on the outer periphery side relative to the lightening holes 5 are continuous to each other through bridge portions 12 between the circular arc-shaped lightening holes 51 and the straight line-shaped lightening holes 52.

A distance (distance in the normal direction) 6L between the edge on the seal bead 4 side in the lightening hole 5 and the seal bead 4 illustrated in FIG. 2 is constant.

The metal gasket configured as described above is placed between joint surfaces facing each other in a connection portion of an exhaust system of an internal-combustion engine for automobiles, for example. At this time, the metal gasket is tightened with a plurality of bolts (not illustrated) passed through the bolt insertion holes 3 to thereby compress and deform the seal bead 4, obtain a surface pressure required for sealing by a repulsive load thereof, and prevent the leakage of exhaust gas from between the joint surfaces.

According to the metal gasket, even when the distance from the seal bead 4 to the outer peripheral edge of the metal plate 1 is not constant due to the fact that the outer shape of the metal plate 1 (flat plate 11) and the opening shape (plane projection shape of the seal bead 4) of the port hole 2 are noncircular, the distance 6L from the outer periphery of the seal bead 4 to the lightening holes 5 is constant by the formation of the lightening holes 5 (circular arc-shaped lightening hole 51 and straight line-shaped lightening hole 52) on the outer periphery side of the seal bead 4. Therefore, the tensile stress generated on the outer periphery side of the seal bead 4 by the molding of the seal bead 4 by a male mold and a female mold (not illustrated) decreases and becomes almost uniform. The tensile stress generated in the bridge portions 12 between the circular arc-shaped lightening holes 51 and the straight line-shaped lightening holes 52 is also effectively suppressed by reducing a width W of the bridge portions 12.

Therefore, a variation in the circumferential direction of the height h of the seal bead 4 is suppressed and a stable seal function can be performed. Moreover, the formation of the lightening holes 5 can reduce the weight of the metal gasket.

Figure 3:
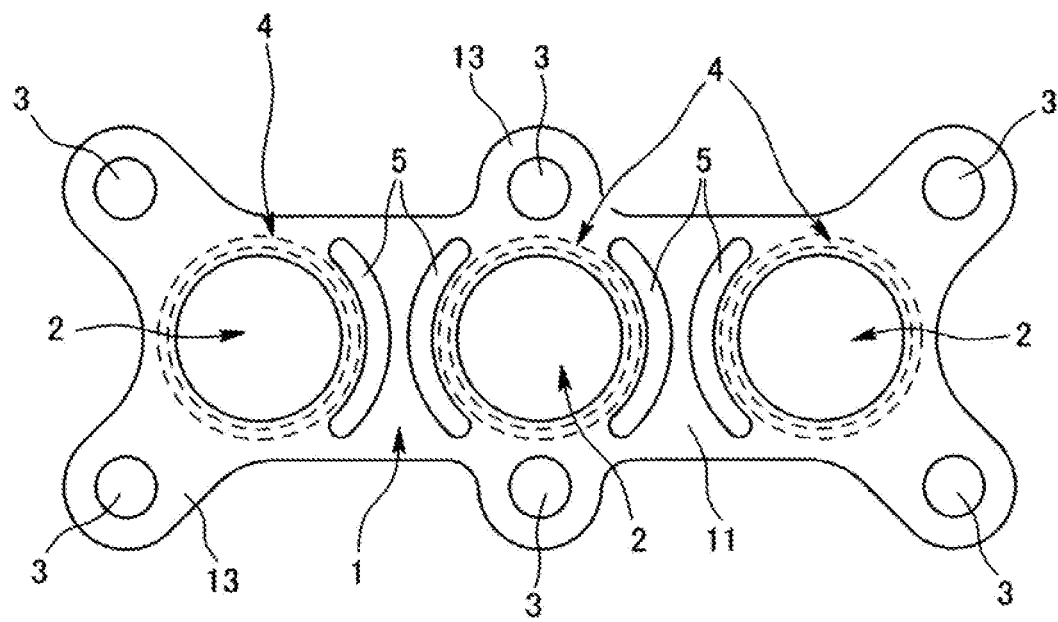
FIG. 3 is a plan view illustrating a second embodiment of a metal gasket according to the present invention.
Figure 4:
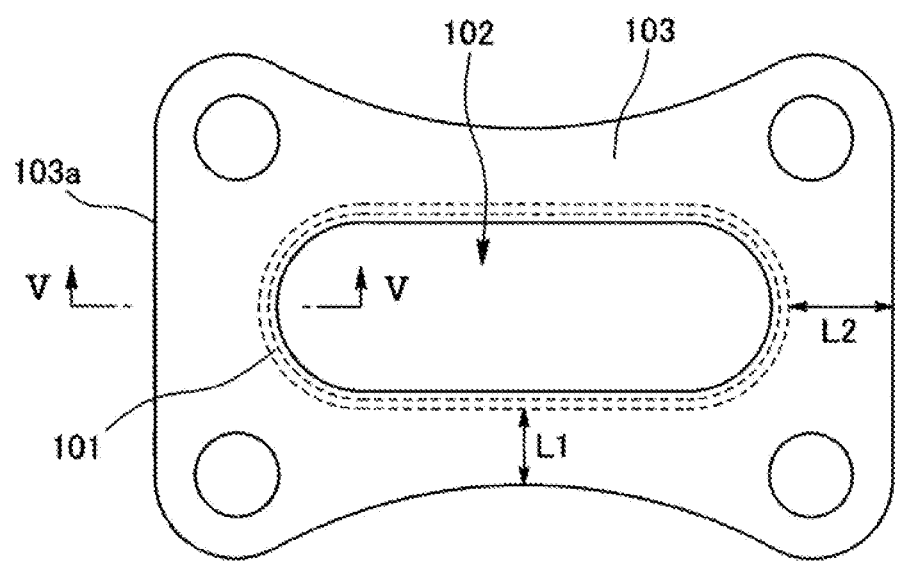
FIG. 4 is a plan view illustrating an example of a conventional metal gasket.
Figure 5:
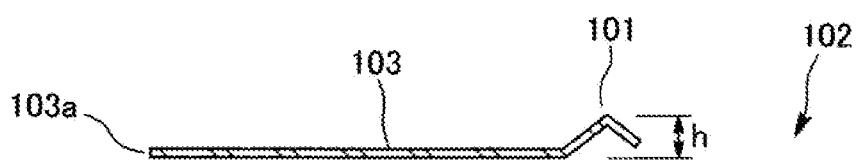
FIG. 5 is a cross-sectional view along the V-V line in FIG. 4.

FIG. 3 illustrates a second embodiment of a metal gasket according to the present invention.

The metal gasket of this embodiment also contains a thin metal plate 1 having moderate elasticity, such as stainless steel or an aluminum alloy, and has three circular port holes 2 arranged in a row. In a plurality of projections 13 formed at predetermined intervals in an outer peripheral portion of the metal plate 1, bolt insertion holes 3 are individually formed. Seal beads 4 are formed concentrically with the port holes 2 along the outer periphery of the port holes 2. Lightening holes 5 are located between the seal beads 4 formed in the periphery of the port holes 2 and are formed into a circular arc shape extending along the outer periphery of the seal beads 4.

Also in this embodiment, a tensile stress generated on the outer periphery side of the seal bead 4 can be reduced and can be made almost uniform by the formation of the lightening holes 5. As a result, a variation in the height of the seal beads 4 can be suppressed and a stable seal function can be performed.

The invention claimed is:

1. A metal gasket comprising:
a metal plate having at least a first opening portion and a second opening portion provided in a row;
a first seal bead having a bent cross-sectional shape surrounding a periphery of the first opening portion, and a second seal bead having a bent cross-sectional shape surrounding a periphery of the second opening portion; and
a first lightening hole extending along an outer periphery of the first seal bead with a constant distance therebetween, and a second lightening hole extending along an outer periphery of the second seal bead with a constant distance therebetween,
wherein the first and second lightening holes are located between the first and second seal beads, and midpoints of the first lightening hole and the second lightening hole, respectively, intersect a virtual line that extends through a center of both of the first and second opening portions; and
wherein an inner periphery of the first lightening hole is radially spaced apart from the outer periphery of the first seal bead by the constant distance with respect to a radial direction of the first opening portion, and an inner periphery of the second lightening hole is radially spaced apart from the outer periphery of the second seal bead by the constant distance with respect to a radial direction of the second opening portion.

2. The metal gasket according to claim 1, wherein the first seal bead that surrounds the first opening portion terminates at a terminal edge of the metal plate that defines the first opening portion, and the terminal edge of the metal plate that defines the first opening portion, and the terminal edge of the metal plate that defines the first opening portion is radially spaced apart form the inner periphery of the first lightening hole located nearest to the first opening portion; and
wherein the second seal bead that surrounds the second opening portion terminates at a terminal edge of the metal plate that defines the second opening portion, and the terminal edge of the metal plate that defines the second opening portion is radially spaced apart from the inner periphery of the second lightening hole located nearest to the second opening portion.

3. A metal gasket comprising:
a metal plate having a first port hole and a second port hole aligned in a row;
a first seal bead having a bent cross-sectional shape surrounding an entirety of the first port hole;
a second seal bead having a bent cross-sectional shape surrounding an entirety of the second port hole;
a first slot extending along an outer periphery of the first seal bead with a constant distance between the first slot and the first seal bead; and
a second slot extending along an outer periphery of the second seal bead with a constant distance between the second slot and the second seal bead,
wherein the first and second slots are located between the first and second seal beads,
a midpoint of the first slot and a midpoint of the second slot are collinear with a center of the first port hole and a center of the second port hole, and
wherein an inner periphery of the first slot is radially spaced apart from the outer periphery of the first seal bead by the constant distance with respect to a radial direction of the first port hole, and an inner periphery of the second slot is radially spaced apart from the outer periphery of the second seal bead by the constant distance with respect to a radial direction of the second port hole.

4. The metal gasket according to claim 3, wherein each of the first and second seal beads terminate at a terminal edge of the metal plate that defines the first and second port holes, respectively, and the terminal edges of the metal plate that defines the respective port hole is spaced apart from respective slot.

5. A metal gasket comprising:
a metal plate;
a first seal bead formed in the metal plate, the first seal bead having a bent cross-sectional shape terminating at an inner peripheral edge defining a periphery of a first port hole;
a second seal bead formed in the metal plate, the second seal bead having a bent cross-sectional shape terminating at an inner peripheral edge defining a periphery of a second port hole, the second port hole and the first port hole being aligned in a row;
a first slot formed in the metal plate, the first slot extending partially along an outer periphery of the first seal bead with a constant distance between the first slot and the first seal bead; and
a second slot formed in the metal plate, the second slot extending partially along an outer periphery of the second seal bead with a constant distance between the second slot and the second seal bead,
wherein the first and second slots are located adjacent to one another between the first and second seal beads,
a midpoint of the first slot and a midpoint of the second slot are collinear with a center of the first port hole and a center of the second port hole, and
wherein an inner periphery of the first slot is radially spaced apart from the outer periphery of the first seal bead by the constant distance with respect to a radial direction of the first port hole, and an inner periphery of the second slot is spaced apart from the outer periphery of the second seal bead by the constant distance with respect to a radial direction of the second port hole.

6. The metal gasket according to claim 5, wherein the inner peripheral edge that defines the first and second port holes are each respectively defined by a terminal edge of the metal plate, and the terminal edge is spaced apart from a respective slot.

* * * * *